(12) United States Patent
Tomizawa et al.

(10) Patent No.: US 9,245,471 B2
(45) Date of Patent: Jan. 26, 2016

(54) MULTIPLE-PRIMARY COLOR LIQUID CRYSTAL DISPLAY APPARATUS

(75) Inventors: Kazunari Tomizawa, Osaka (JP);
Kohzoh Nakamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 323 days.

(21) Appl. No.: 13/807,380

(22) PCT Filed: Jun. 30, 2011

(86) PCT No.: PCT/JP2011/065078
§ 371 (c)(1),
(2), (4) Date: Dec. 28, 2012

(87) PCT Pub. No.: WO2012/005170
PCT Pub. Date: Jan. 12, 2012

(65) Prior Publication Data
US 2013/0100179 A1    Apr. 25, 2013

(30) Foreign Application Priority Data

Jul. 6, 2010    (JP) .................................. 2010-154255

(51) Int. Cl.
*G09G 5/10*    (2006.01)
*G09G 3/20*    (2006.01)
(Continued)

(52) U.S. Cl.
CPC .......... *G09G 3/2003* (2013.01); *G09G 3/3611* (2013.01); *H04N 9/68* (2013.01); *G09G 2300/0452* (2013.01); *G09G 2320/0666* (2013.01); *G09G 2340/06* (2013.01)

(58) Field of Classification Search
CPC .................... G09G 3/2003; G09G 2300/0452; G09G 2320/0666; G09G 2340/06
See application file for complete search history.

(56) References Cited

U.S. PATENT DOCUMENTS

| 4,800,375 A | 1/1989 | Silverstein et al. |
| 6,661,488 B1 | 12/2003 | Takeda et al. |

(Continued)

FOREIGN PATENT DOCUMENTS

| JP | 09-251160 A | 9/1997 |
| JP | 11-242225 A | 9/1999 |

(Continued)

OTHER PUBLICATIONS

Official Communication issued in International Patent Application No. PCT/JP2011/065078, mailed on Oct. 4, 2011.

(Continued)

*Primary Examiner* — Lixi C Simpson
(74) *Attorney, Agent, or Firm* — Keating & Bennett, LLP (57) ABSTRACT

A multi-primary-color liquid crystal display device (100) according to the present invention includes a liquid crystal display panel (10) with a pixel made up of red, green, blue and yellow subpixels (R, G, B, Ye) and a signal conversion circuit (20) which converts an input three-primary-color video signal into a four-color video signal. If the three-primary-color video signal supplied to the signal conversion circuit is indicated as (r, g, b) using the grayscale levels r, g and b (each of which is an integer of 0 through 255) of the three primary colors of red, green and blue and if the luminance of the color white displayed by the pixel in response to a three-primary-color video signal indicated as (255, 255, 255) is supposed to be 100%, the signal conversion circuit adjusts the level of the four-color video signal so that when a three-primary-color video signal indicated as (186, 0, 0) is input, the luminance of the color red displayed by the red subpixel becomes equal to or greater than 6.5%.

15 Claims, 6 Drawing Sheets

(51) Int. Cl.
*G09G 3/36* (2006.01)
*H04N 9/68* (2006.01)

(56) References Cited

U.S. PATENT DOCUMENTS

| | | | |
|---|---|---|---|
| 6,710,825 | B2 | 3/2004 | Kubo et al. |
| 6,952,252 | B2 | 10/2005 | Nakanishi |
| 6,977,704 | B2 | 12/2005 | Kataoka |
| 7,268,757 | B2 | 9/2007 | Ben-David et al. |
| 7,436,996 | B2 | 10/2008 | Ben-Chorin et al. |
| 7,598,961 | B2 | 10/2009 | Higgins |
| 8,319,791 | B2 * | 11/2012 | Ueki et al. ............ 345/613 |
| 2004/0150585 | A1 | 8/2004 | Tomisawa |
| 2004/0174389 | A1 | 9/2004 | Ben-David et al. |
| 2005/0122294 | A1 | 6/2005 | Ben-David et al. |
| 2005/0190135 | A1 * | 9/2005 | Chen et al. ............ 345/88 |
| 2005/0206979 | A1 | 9/2005 | Tomizawa et al. |
| 2005/0237450 | A1 * | 10/2005 | Hu et al. ............ 349/108 |
| 2006/0055858 | A1 | 3/2006 | Nakanishi et al. |
| 2009/0160871 | A1 * | 6/2009 | Hsu et al. ............ 345/589 |
| 2009/0189924 | A1 * | 7/2009 | Ogura ............ 345/690 |
| 2009/0322798 | A1 * | 12/2009 | Lin et al. ............ 345/690 |
| 2010/0013748 | A1 * | 1/2010 | Cok et al. ............ 345/83 |
| 2010/0091032 | A1 | 4/2010 | Ueki et al. |
| 2011/0216109 | A1 | 9/2011 | Ueki et al. |

FOREIGN PATENT DOCUMENTS

| | | |
|---|---|---|
| JP | 2001-209047 A | 8/2001 |
| JP | 2001-306023 A | 11/2001 |
| JP | 2002-357830 A | 12/2002 |
| JP | 2003-043525 A | 2/2003 |
| JP | 2003-177418 A | 6/2003 |
| JP | 2004-226835 A | 8/2004 |
| JP | 2004-529396 A | 9/2004 |
| JP | 2005-303989 A | 10/2005 |
| JP | 2006-078968 A | 3/2006 |
| WO | WO 2007039957 A1 * | 4/2007 |
| WO | 2008/038568 A1 | 4/2008 |
| WO | 2010/055626 A1 | 5/2010 |

OTHER PUBLICATIONS

Yang et al.; "31.1: Development of Six Primary-Color LCD"; Society for Information Display, 2005 International Symposium Digest of Technical Papers; vol. XXXVI, Book II; May 25-27, 2005; pp. 1210-1213.

Chino et al.; "25.1: Invited Paper: Development of Wide-Color-Gamut Mobile Displays With Four-Primary-Color LCDs"; Society for Information Display, 2006 International Symposium Digest of Technical Papers; vol. XXXVII, Book II; Jun. 7-9, 2006; pp. 1221-1224.

Ben-Chorin; "Improving LCD TV Color Using Multi-Primary Technology"; FPD International 2005 Forum; Oct. 19, 2005; Total of 66 pages.

Pointer, "The Gamut of Real Surface Colours", Color Research and Application, vol. 5, No. 3, 1980, pp. 145-155.

English translation of Official Communication issued in corresponding International Application PCT/JP2011/065078, mailed on Feb. 21, 2013.

* cited by examiner

MULTIPLE-PRIMARY COLOR LIQUID CRYSTAL DISPLAY APPARATUS

TECHNICAL FIELD

The present invention relates to a liquid crystal display device and more particularly relates to a multi-primary-color liquid crystal display device.

BACKGROUND ART

Liquid crystal display devices and various other types of display devices are currently used in a variety of applications. In a general display device, a single pixel consists of three subpixels respectively representing red, green and blue, which are the three primary colors of light, thereby conducting a display operation in colors.

Figure 9:
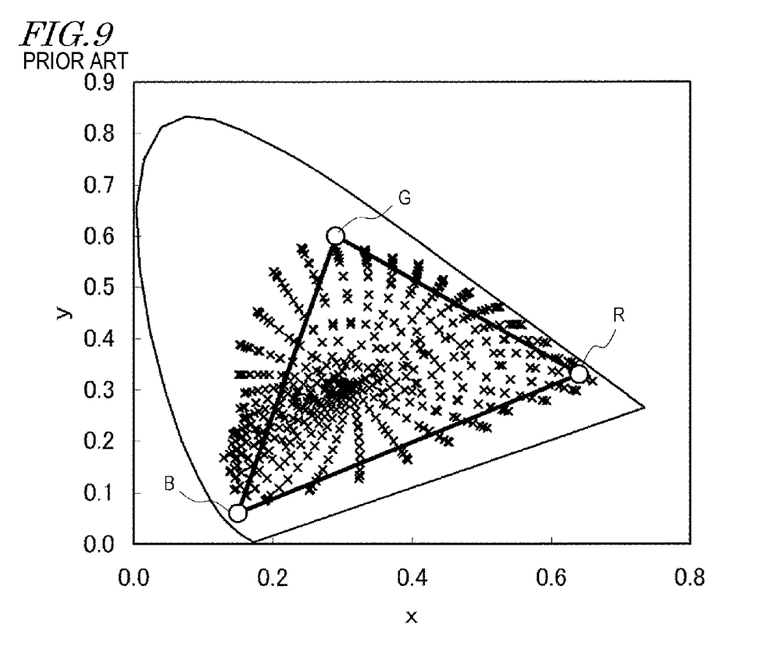
[FIG. 9] An xy chromaticity diagram showing the color reproduction range of a traditional display device which conducts a display operation in the three primary colors.

A traditional display device, however, can reproduce colors that fall within only a narrow range (which is usually called a "color reproduction range"), which is a problem. FIG. 9 shows the color reproduction range of a traditional display device that conducts a display operation using the three primary colors. Specifically, FIG. 9 shows an xy chromaticity diagram according to the XYZ color system, in which the triangle, formed by three points corresponding to the three primary colors of red, green and blue, represents the color reproduction range. Also plotted by crosses x in FIG. 9 are the surface colors of various objects existing in Nature, which were disclosed by Pointer (see Non-Patent Document No. 1). As can be seen from FIG. 9, there are some object colors that do not fall within the color reproduction range, and therefore, a display device that conducts a display operation using the three primary colors cannot reproduce some object colors.

Thus, in order to broaden the color reproduction range of display devices, a technique that increases the number of primary colors used for display purposes to four or more has been proposed recently.

Figure 10:
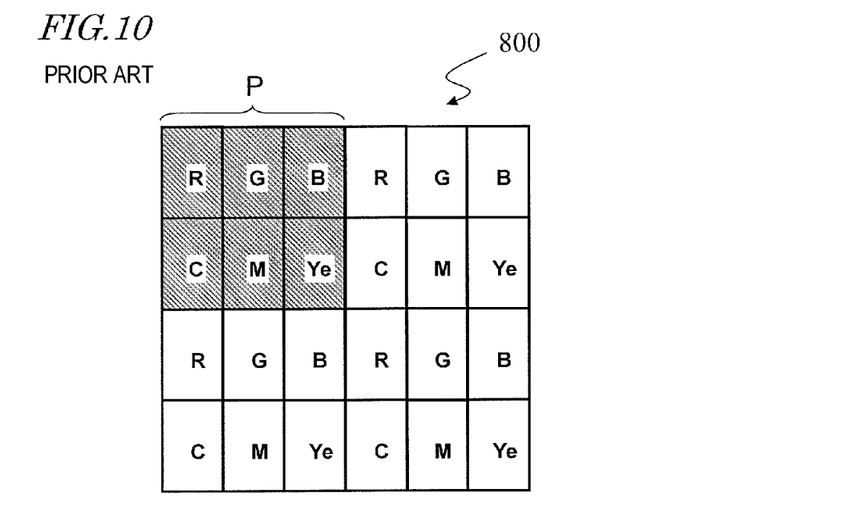
[FIG. 10] Schematically illustrates a traditional multi-primary-color liquid crystal display device 800.
Figure 11:
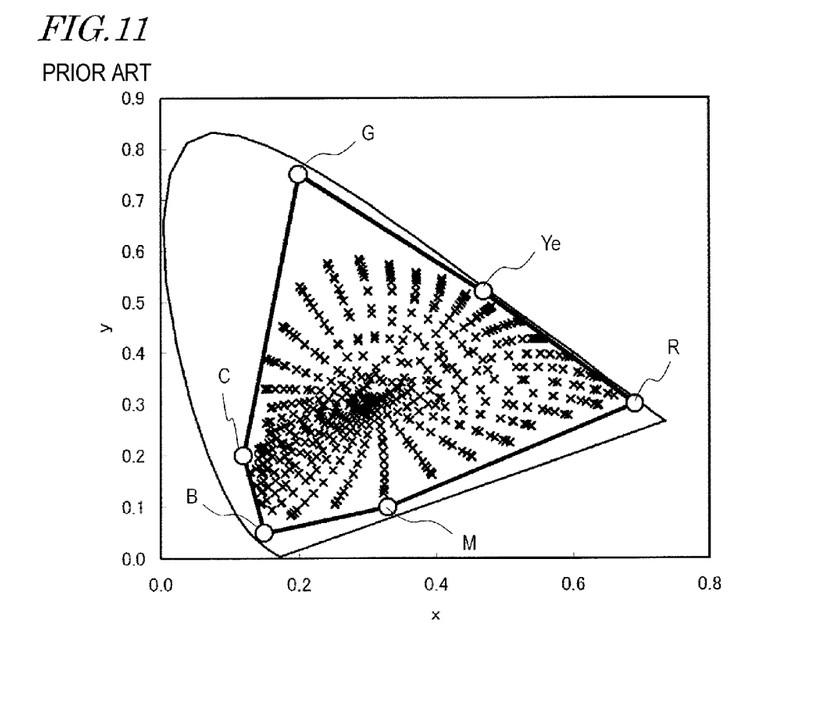
[FIG. 11] An xy chromaticity diagram showing the color reproduction range of the multi-primary-color liquid crystal display device 800.

For example, Patent Document No. 1 discloses a liquid crystal display device 800 in which one pixel P consists of red, green, blue, cyan, magenta and yellow subpixels R, G, B, C, M and Ye representing the colors red, green, blue, cyan, magenta and yellow, respectively, as shown in FIG. 10. The color reproduction range of such a liquid crystal display device 800 is shown in FIG. 11. As shown in FIG. 11, the color reproduction range, represented by a hexagon of which the six vertices correspond to those six primary colors, covers almost all object colors. By increasing the number of primary colors for use in display in this manner, the color reproduction range can be broadened.

Patent Document No. 1 also discloses a liquid crystal display device in which one pixel P consists of red, green, blue and yellow subpixels R, G, B, Ye and a liquid crystal display device in which one pixel P consists of red, green, blue, cyan and yellow subpixels R, G, B, C, Ye. In any case, by using four or more primary colors, the color reproduction range can be broadened compared to traditional liquid crystal display devices that use only the three primary colors for display purposes. In this description, a display device that carries out a display operation using four or more primary colors will be referred to herein as a "multi-primary-color display device" and a liquid crystal display device that carries out a display operation using four or more primary colors will be referred to herein as a "multi-primary-color liquid crystal display device" (or simply a "multi-primary-color LCD"). Meanwhile, an ordinary display device that carries out a display operation using the three primary colors will be referred to herein as a "three-primary-color display device" and a liquid crystal display device that carries out a display operation using the three primary colors will be referred to herein as a "three-primary-color liquid crystal display device" (or simply a "three-primary-color LCD").

A video signal input to a three-primary-color display device generally has an RGB format or a YCrCb format. A video signal in any of those formats has three parameters (i.e., is a so-called "three-dimensional signal"), and therefore, the luminances of the three primary colors (that are red, green and blue) for use to conduct a display operation are determined unequivocally.

For a multi-primary-color display device to perform a display operation, a video signal with a format for a three-primary-color display device needs to be converted into a video signal with more (i.e., four or more) parameters. Such a video signal representing four or more primary colors will be referred to herein as a "multi-primary-color video signal".

When the colors represented by a video signal in a format for a three-primary-color display device (which will be referred to herein as a "three-primary-color video signal") are expressed in four or more primary colors, the luminances of the respective primary colors are not determined unambiguously but their luminances have a lot of different combinations. That is why a three-primary-color video signal is not converted into a multi-primary-color video signal by only one method but by any of various other methods very arbitrarily (with a lot of freedom). Methods for converting a three-primary-color video signal into a multi-primary-color video signal are proposed in Patent Documents Nos. 2 and 3, for example. Naturally, however, they are not the only ones but there is a wide variety of methods available.

CITATION LIST

Patent Literature

Patent Document No. 1: PCT International Application Japanese National-Phase Publication No. 2004-529396
Patent Document No. 2: U.S. Pat. No. 7,598,961
Patent Document No. 3: U.S. Pat. No. 7,436,996

Non-Patent Literature

Non-Patent Document No. 1: M. R. Pointer, "The Gamut of Real Surface Colors," Color Research and Application, Vol. 5, No. 3, pp. 145-155 (1980)

SUMMARY OF INVENTION

Technical Problem

As described above, any of various methods may be adopted to convert a three-primary-color video signal into a multi-primary-color video signal. And the best signal converting method for a multi-primary-color display device has not been found yet. The same can said about the best signal converting method for a multi-primary-color liquid crystal display device, too.

The present inventors carried out extensive research on such signal converting methods for a multi-primary-color liquid crystal display device. As a result, it turned out that simply by converting a three-primary-color video signal into a multi-primary-color video signal, the colors red and orange displayed looked less impressive.

The present inventors perfected our invention to overcome such problem with the related art by providing a multi-primary-color liquid crystal display device that can display the colors red and orange that look impressive.

Solution to Problem

A multi-primary-color liquid crystal display device according to the present invention includes a liquid crystal display panel with a pixel made up of red, green, blue and yellow subpixels. The device further includes a signal conversion circuit which converts an input three-primary-color video signal into a four-color video signal corresponding to the colors red, green, blue and yellow that are displayed by the red, green, blue and yellow subpixels, respectively. If the three-primary-color video signal supplied to the signal conversion circuit is indicated as (r, g, b) using the grayscale levels r, g and b (each of which is an integer of 0 through 255) of the three primary colors of red, green and blue and if the luminance of the color white displayed by the pixel in response to a three-primary-color video signal indicated as (255, 255, 255) is supposed to be 100%, the signal conversion circuit adjusts the level of the four-color video signal so that when a three-primary-color video signal indicated as (186, 0, 0) is input, the luminance of the color red displayed by the red subpixel becomes equal to or greater than 6.5%.

In one preferred embodiment, if a three-primary-color video signal indicated as (223, 0, 0) has been input, the signal conversion circuit adjusts the level of the four-color video signal so that the luminance of the color red displayed by the red subpixel becomes equal to or greater than 9.7%.

Alternatively, a multi-primary-color liquid crystal display device according to the present invention includes a liquid crystal display panel with a pixel made up of red, green, blue and yellow subpixels. The device further includes a signal conversion circuit which converts an input three-primary-color video signal into a four-color video signal corresponding to the colors red, green, blue and yellow that are displayed by the red, green, blue and yellow subpixels, respectively. If the three-primary-color video signal supplied to the signal conversion circuit is indicated as (r, g, b) using the grayscale levels r, g and b (each of which is an integer of 0 through 255) of the three primary colors of red, green and blue and if the luminance of the color white displayed by the pixel in response to a three-primary-color video signal indicated as (255, 255, 255) is supposed to be 100%, the signal conversion circuit adjusts the level of the four-color video signal so that when a three-primary-color video signal indicated as (223, 0, 0) is input, the luminance of the color red displayed by the red subpixel becomes equal to or greater than 9.7%.

In one preferred embodiment, the signal conversion circuit adjusts the level of the four-color video signal so that when a three-primary-color video signal, in which the color red has a grayscale level r of 186 or more, is input, the luminance of the color red displayed by the red subpixel becomes equal to or greater than 6.5%.

In one preferred embodiment, the signal conversion circuit adjusts the level of the four-color video signal so that when a three-primary-color video signal, in which the color red has a grayscale level r of 223 or more, is input, the luminance of the color red displayed by the red subpixel becomes equal to or greater than 9.7%.

In one preferred embodiment, the signal conversion circuit adjusts the level of the four-color video signal so that when a three-primary-color video signal, in which the color red has a grayscale level r of 186 to 223, is input, the luminance of the color red displayed by the red subpixel becomes equal to or greater than $13(r/255)^{1/0.45}$%.

In one preferred embodiment, the respective areas of the red, green, blue and yellow subpixels are equal to each other.

In one preferred embodiment, the signal conversion circuit includes a four-color converting section which generates the four-color video signal based on the input three-primary-color video signal and a red level adjusting section which adjusts the grayscale level of the color red of the four-color video signal obtained by the four-color converting section.

Advantageous Effects of Invention

The present invention provides a multi-primary-color liquid crystal display device that can display the colors red and orange that look impressive.

BRIEF DESCRIPTION OF DRAWINGS

[FIGS. 2] (a) and (b) illustrate a single pixel of the LCD panel 10 that the liquid crystal display device 100 has.

[FIGS. 3] (a) and (b) are graphs which show the gamma characteristic of the red subpixel R of the liquid crystal display device 100 and of which the abscissa represents the color red input grayscale level and the ordinate represents the color red output luminance.

[FIGS. 7] (a) through (f) show the relation between the colors red, green and blue grayscale levels r, g, b of an input three-primary-color video signal and the color components extracted.

[FIGS. 8] (a) and (b) illustrate how grayscales may be allocated to those color components extracted.

DESCRIPTION OF EMBODIMENTS

Before embodiments of the present invention are described, it will be described first why the colors red and orange often look less impressive in a multi-primary-color LCD.

Such loss of impressiveness is brought about by a decrease in the relative luminance of the color red displayed by the red subpixel to be caused by adding another primary color (i.e., by adding a new subpixel). For example, if the color yellow has been added as another primary color (i.e., if one pixel consists of red, green, blue, and yellow subpixels), the relative luminance of the color red decreases to a half or less. Specifically, supposing the luminance of the color white displayed by a pixel (i.e., the color white with the highest grayscale) is 100%, the luminance of the color red displayed by the red subpixel (i.e., the color red with the highest grayscale) is approximately 24% in a three-primary-color LCD but is approximately 11% in a multi-primary-color LCD to which the yellow subpixel has been added. That is to say, the latter is about 0.46 times as high as the former.

There are three factors that cause such a decrease in the relative luminance of the color red.

One factor is a decrease in the ratio of the area (which will be referred to herein as an "area ratio") of the red subpixel to the entire area of a pixel. Specifically, if the yellow subpixel is added, the number of subpixels that form a single pixel increases from three to four. That is why if the areas of the respective subpixels are equal to each other, then the area ratio of the red subpixel decreases to be 0.75 times as large as the original one.

Another factor is a decrease in the relative Y value of the red color filter. If the yellow color filter has been added, the overall color filter layer will have a higher Y value because the yellow color filter has a high optical transmittance (i.e., has a large Y value). That is why the relative Y value of the red color filter decreases by the factor of approximately 0.85.

And a third factor is a decrease in the intensity of the color red range in the emission spectrum of a backlight. If the yellow subpixel has been added, the intensity of the color blue range in the emission spectrum of the backlight is increased in order to maintain a white balance. Consequently, the intensity of the color red range decreases to be approximately 0.72 times as large as the original one.

Taking these three factors into consideration, the relative intensity of the color red decreases to be approximately 0.46 (=0.75×0.85×0.72) times as large as the original one. That is why even though the color red has a luminance of approximately 24% in a three-primary-color LCD, the color red has a luminance of approximately 11% in a multi-primary-color LCD to which the yellow subpixel has been added. As a result, the relative luminance of the color red displayed by the red subpixel decreases and the colors red and orange displayed by the pixel look less impressive. Consequently, a sufficiently high display quality cannot be realized simply by converting a three-primary-color video signal into a multi-primary-color video signal (e.g., just by converting the signal by the method disclosed in Patent Document No. 2 or 3).

The present inventors perfected our invention based on such a discovery. Hereinafter, embodiments of the present invention will be described with reference to the accompanying drawings. It should be noted that the present invention is in no way limited to the embodiments to be described below.

Figure 1:
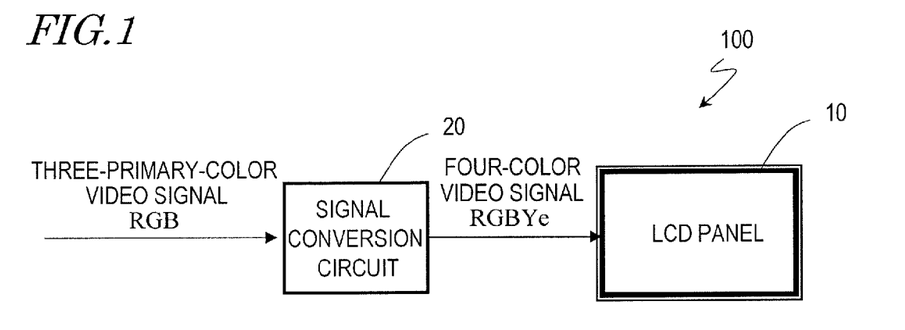
[FIG. 1] A block diagram illustrating a liquid crystal display device 100 as a preferred embodiment of the present invention.

FIG. 1 illustrates a liquid crystal display device 100 as an embodiment of the present invention. As shown in FIG. 1, the liquid crystal display device 100 is a multi-primary-color LCD which includes an LCD panel 10 and a signal conversion circuit 20 and which conducts a display operation in colors using four primary colors.

Figure 2:
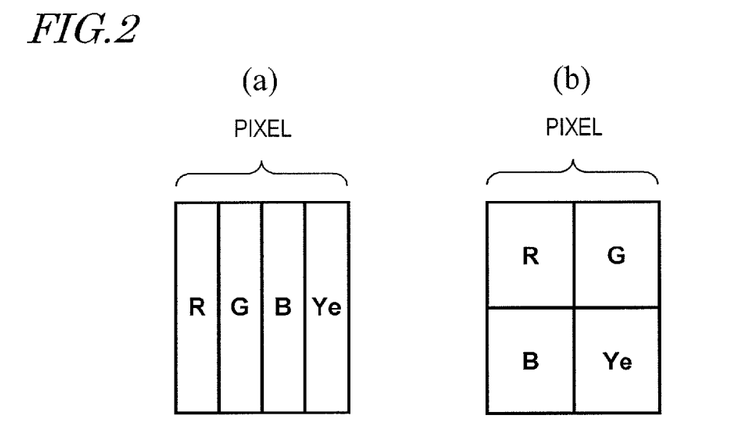

The LCD panel 10 includes a plurality of pixels which are arranged in a matrix pattern. Each of those pixels is made up of four subpixels. FIG. 2(a) illustrates a specific configuration for a single pixel of the LCD panel 10. As shown in FIG. 2(a), a single pixel is comprised of red, green, blue, and yellow subpixels R, G, B and Ye representing the colors red, green, blue, and yellow, respectively.

Even though a configuration in which four subpixels are arranged in one row and four columns in a single pixel is illustrated in FIG. 2(a), the red, green, blue, and yellow subpixels R, G, B and Ye may also be arranged in two rows and two columns (i.e., to form a matrix pattern) in a single pixel as shown in FIG. 2(b). As shown in FIGS. 2(a) and 2(b), in this embodiment, the respective areas of the red, green, blue, and yellow subpixels R, G, B and Ye are equal to each other.

FIG. 2(a) illustrates a configuration in which the red, green, blue, and yellow subpixels R, G, B and Ye are arranged in this order from the left to the right in a pixel. On the other hand, FIG. 2(b) illustrates a configuration in which the red, green, yellow, and blue subpixels R, G, Ye and B are arranged in this order clockwise from the upper left corner of a pixel. However, these are not the only arrangements of subpixels in a pixel. Rather the red, green, blue, and yellow subpixels R, G, B and Ye may also be arranged in any other order in a pixel.

The signal conversion circuit 20 converts an input three-primary-color video signal into a multi-primary-color video signal. More specifically, the multi-primary-color video signal generated by the signal conversion circuit 20 is a four-color video signal corresponding to the colors red, green, blue, and yellow that are displayed by the red, green, blue, and yellow subpixels R, G, B and Ye, respectively.

The signal conversion circuit 20 converts the three-primary-color video signal in an RGB format representing the respective luminances of the color red, green and blue into a four-color video signal representing the respective luminances of the colors red, green, blue, and yellow. It should be noted that the format of the three-primary-color video signal does not have to be the RGB format but may also be an XYZ format or a YCrCb format as well. No matter what format it adopts, the three-primary-color video signal indicates the respective grayscale levels of the colors red, green and blue either directly or indirectly. That is why if the respective grayscale levels of the three primary colors of red, green and blue are identified by r, g and b, the three-primary-color video signal may be represented as (r, g, b). If the three-primary-color video signal is a digital signal in which 8 bits are allocated to each of the three primary colors, each of r, g and b is an integer of 0 through 255.

The LCD panel 10 receives the four-color video signal that has been generated by the signal conversion circuit 20 and colors represented by the four-color video signal are displayed by the respective pixels. Any of various display modes may be used as the display mode of the LCD panel 10. For example, a vertical alignment mode (VA mode) that realizes a wide viewing angle characteristic is suitably used.

Specifically, as the vertical alignment mode, the MVA (multi-domain vertical alignment) mode disclosed in Japanese Laid-Open Patent Publication No. 11-242225 or the CPA mode (continuous pinwheel alignment) mode disclosed in Japanese Laid-Open Patent Publication No. 2003-43525 may be used. The MVA or CPA mode panel includes a vertical alignment liquid crystal layer in which liquid crystal molecules are aligned perpendicularly to the substrate when no voltage is applied thereto, and those liquid crystal molecules tilt in multiple different directions in each subpixel when a voltage is applied thereto, thereby carrying out a wide viewing angle display operation. Naturally, the TN (twisted nematic) mode, the IPS (in-plane switching) mode, the FFS (fringe field switching) mode or any other display mode may be used as well.

Alternatively, the PSA (polymer sustained alignment) technology may also be used. The PSA technology is disclosed in Japanese Laid-Open Patent Publications No. 2002-357830, No. 2003-177418 and No. 2006-78968, for example. According to the PSA technology, a small amount of a polymerizable compound (such as a photo-polymerizable monomer or oligomer) is introduced into the liquid crystal material, and the polymerizable material is irradiated with an active energy ray (such as an ultraviolet ray) with a predetermined voltage applied to the liquid crystal layer after the liquid crystal cell has been assembled, thereby controlling the pretilt direction of liquid crystal molecules with the polymer thus produced. The alignment state of the liquid crystal molecules when the polymer is produced is sustained (i.e., memorized) even after the voltage is removed (i.e., no longer applied). A layer of such a polymer will be referred to herein as an "alignment sustained layer". The alignment sustained layer is formed on the surface of an alignment film (i.e., to face the liquid crystal layer). However, the alignment sustained layer does not always have to be a film that covers the entire surface of the alignment film but may also be a layer in which particles of the polymer are present discretely.

In the liquid crystal display device 100 of this embodiment, the signal conversion circuit 20 not just simply converts the three-primary-color video signal into a four-color video signal but also adjusts the level of the four-color video signal as well.

Specifically, if the luminance of the color white displayed by the pixel in response to a three-primary-color video signal indicated as (255, 255, 255) (i.e., the color white with the highest grayscale) is supposed to be 100%, the signal conversion circuit 20 adjusts the level of the four-color video signal so that when a three-primary-color video signal indicated as (186, 0, 0) is input, the luminance of the color red displayed by the red subpixel R becomes equal to or greater than 6.5% Also, if a three-primary-color video signal indicated as (223, 0, 0) has been input, the signal conversion circuit 20 adjusts the level of the four-color video signal so that the luminance of the color red displayed by the red subpixel R becomes equal to or greater than 9.7%.

By making the signal conversion circuit 20 adjust the level of the four-color video signal as described above, the color red or orange that looks impressive can be displayed. The reason will be described with reference to FIGS. 3(a) and 3(b). In FIGS. 3(a) and 3(b), the abscissa indicates the grayscale level r of the color red represented by the three-primary-color video signal (which is called the "input grayscale level of the color red") and the ordinate indicates the luminance of the color red displayed by the red subpixel R (which is called the "output luminance of the color red"). FIGS. 3(a) and 3(b) show the gamma characteristics of the red subpixel R in the liquid crystal display device 100 according to a preferred embodiment of the present invention. In FIGS. 3(a) and 3(b), also shown as a comparative example is the gamma characteristic of the red subpixel R in a situation where the signal conversion circuit 20 does not adjust the level of the four-color video signal (i.e., when the signal conversion circuit 20 simply converts the input signal). In addition, also shown in FIGS. 3(a) and 3(b) as a reference example is the gamma characteristic of the red subpixel R in a virtual multi-primary-color LCD in which the red subpixel R has the highest luminance of 13%.

The present inventors carried out experiments to see how the impressiveness of the color red or orange displayed by a pixel changes with the luminance of the red subpixel R. As a result, we discovered that if the gamma characteristic of the red subpixel R was adjusted to its gamma characteristic when the highest luminance of the red subpixel R was virtually increased to 13%, the impressiveness of the color red or orange could be increased to a permissible degree.

As shown in FIGS. 3(a) and 3(b), the gamma characteristic of the red subpixel R in the liquid crystal display device 100 of this embodiment shifts to have a higher luminance than that of the comparative example (i.e., the original gamma characteristic so to speak) and agrees with that of the reference example (i.e., the gamma characteristic when the highest luminance is 13%) at almost all grayscales. That is why if a three-primary-color video signal indicated as (186, 0, 0) has been input (i.e., if the color red has an input grayscale level of 186), the output luminance of the color red should be 5.5% as in the comparative example but is actually 6.5% as in the reference example as shown in FIG. 3(a). On the other hand, if a three-primary-color video signal indicated as (223, 0, 0) has been input (i.e., if the color red has an input grayscale level of 223), the output luminance of the color red should be 8.2% as in the comparative example but is actually 9.7% as in the reference example as shown in FIG. 3(b).

The color red or orange looks much less impressive when "15. Red" or "7. Orange" of the Macbeth chart is displayed, for example. If the signal is just converted as in the related art, "15. Red" will not look impressive due to the shortage of luminance and "7. Orange" turns yellowish and will not look impressive, either. "15. Red" of the Macbeth chart corresponds to a three-primary-color video signal indicated as (186, 70, 73) and "7. Orange" corresponds to a three-primary-color video signal indicated as (223, 141, 57). That is why if the output luminance of the color red is increased to a permissible value by adjusting the level of the four-color video signal at the color red input grayscale level(s) (which may be 186 and/or 223) corresponding to "15. Red" and/or "7. Orange" of the Macbeth chart, the color red or orange that looks impressive can be displayed.

Hereinafter, it will be described how high the color red grayscale level of the four-color video signal should be in order to increase the output luminance of the color red to a permissible value.

If the gamma value is a very normal value of 2.2 and if the highest luminance of the color red is supposed to be A (%), then the luminance $LR_x$ (%) of the color red at a grayscale X is represented by the following Equation (1):

$$LR_x = A(X/255)^{1/0.45} \quad (1)$$

That is why if the highest luminance of the color red is 11%, the luminance $LR_{186}$ of the color red when the color red input grayscale level is 186 becomes 5.5% as represented by the following Equation (2):

$$LR_{186} = 11(186/255)^{1/0.45} = 5.5 \quad (2)$$

On the other hand, if the highest luminance of the color red is 13%, the luminance $LR_{186}$ of the color red when the color red input grayscale level is 186 becomes 6.5% as represented by the following Equation (3):

$$LR_{186} = 13(186/255)^{1/0.45} = 6.5 \quad (3)$$

Thus, the grayscale $X_1$ at which the LCD panel 10 in which the color red has the highest luminance of 11% can achieve the luminance of 6.5% is calculated 201 by the following Equation (4):

$$6.5 = 11(X_1/255)^{1/0.45} \quad (4)$$

Consequently, if a three-primary-color video signal, in which the color red has a grayscale level r of 186, has been input, the signal conversion circuit 20 can increase the luminance of the color red displayed by the red subpixel R from the original value of 5.5% to 6.5% by adjusting (i.e., increasing) the grayscale level of the color red in the four-color video signal to 201.

Also, if the highest luminance of the color red is 11%, the luminance $LR_{223}$ of the color red when the color red input grayscale level is 223 becomes 8.2% as represented by the following Equation (5):

$$LR_{223} = 11(223/255)^{1/0.45} = 8.2 \quad (5)$$

On the other hand, if the highest luminance of the color red is 13%, the luminance $LR_{223}$ of the color red when the color red input grayscale level is 223 becomes 9.7% as represented by the following Equation (6):

$$LR_{223}=13(223/255)^{1/0.45}=9.7 \qquad (6)$$

Thus, the grayscale $X_2$ at which the LCD panel 10 in which the color red has the highest luminance of 11% can achieve the luminance of 9.7% is calculated 241 by the following Equation (7):

$$9.7=11(X_2/255)^{1/0.45} \qquad (7)$$

Consequently, if a three-primary-color video signal, in which the color red has a grayscale level r of 223, has been input, the signal conversion circuit 20 can increase the luminance of the color red displayed by the red subpixel R from the original value of 8.2% to 9.7% by adjusting (i.e., increasing) the grayscale level of the color red in the four-color video signal to 241.

Figure 3:
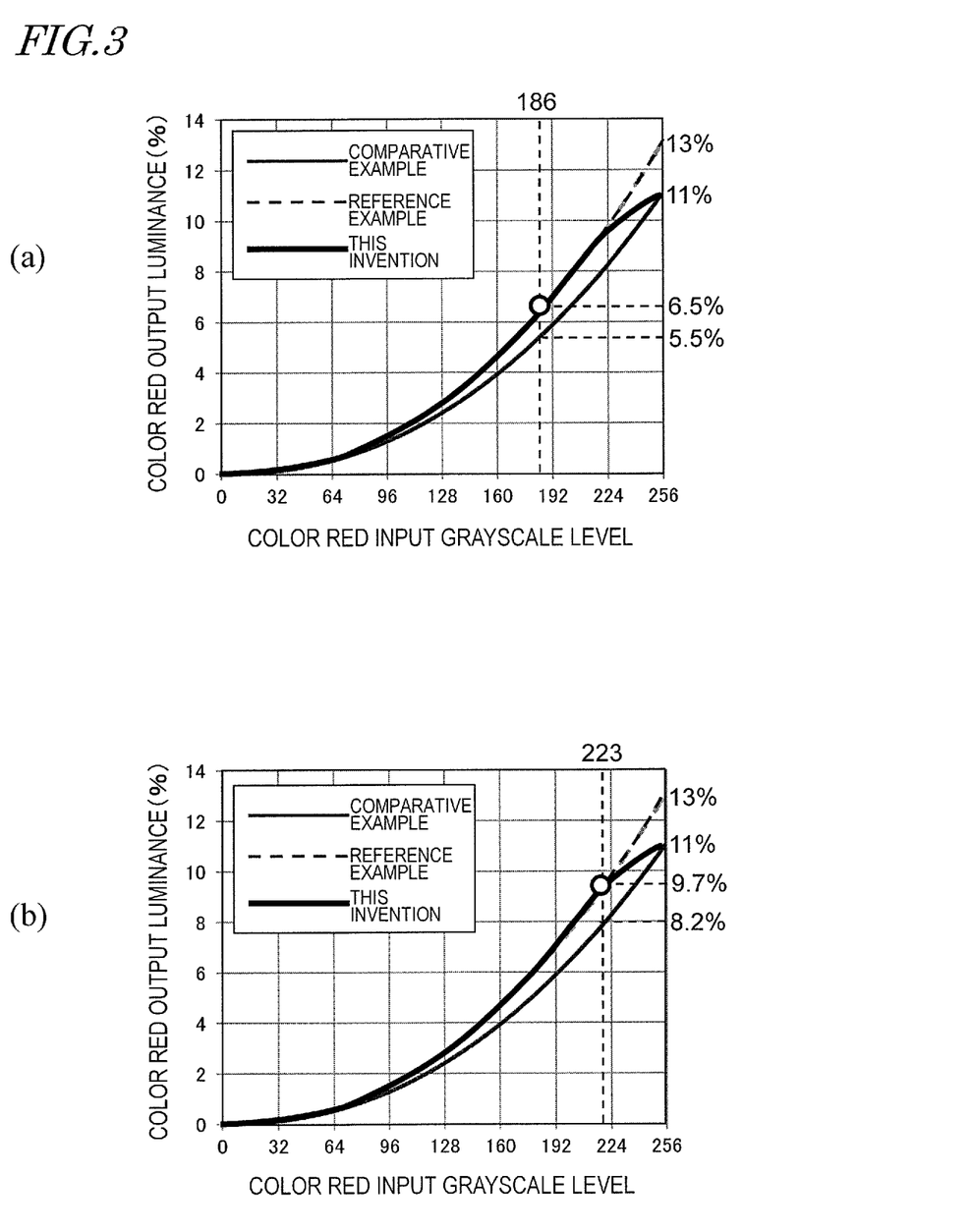

In the example shown in FIG. 3, the gamma characteristic of the red subpixel R is adjusted to its gamma characteristic when the highest luminance is 13%. However, to make the color red or orange look even more impressive, the luminance of the red subpixel R may be further increased and the gamma characteristic of the red subpixel R may be adjusted to its gamma characteristic when the highest luminance exceeds 13%. That is to say, the level of the four-color video signal may be adjusted so that the color red output luminance exceeds 6.5% when the color red input grayscale level is 186 or 9.7% when the color red input grayscale level is 223.

As also shown in FIG. 3, even if the input grayscale level is neither 186 nor 223, it is recommended that the level be adjusted so as to increase the output luminance of the color red, too. That is to say, the signal conversion circuit 20 suitably adjusts the level of the four-color video signal so that when a three-primary-color video signal, in which the color red has a grayscale level r of 186 or more, is input, the luminance of the color red becomes equal to or greater than 6.5% and that when a three-primary-color video signal, in which the color red has a grayscale level r of 223 or more, is input, the luminance of the color red becomes equal to or greater than 9.7%.

The following Table 1 summarizes the original values (i.e., the values before the level adjustment) and permissible values (i.e., the values after the level adjustment) of the color red output luminance and the color red grayscale levels of the four-color video signal that achieve those permissible values in four situations where the color red input grayscale levels are 186, 200, 210 and 223, respectively:

TABLE 1

| Color red input grayscale level | Color red output luminance | | Color red grayscale level of four-color video signal |
| --- | --- | --- | --- |
| | Original value (before level adjustment) | Permissible value (after level adjustment) | |
| 186 | 5.5% | 6.5% | 201 |
| 200 | 6.4% | 7.6% | 216 |
| 210 | 7.2% | 8.5% | 227 |
| 223 | 8.2% | 9.7% | 241 |

As can be seen from this Table 1, if the color red input grayscale level is 200, the color red grayscale level of the four-color video signal may be adjusted to 216 in order to increase the color red output luminance from the original value of 6.4% to the permissible value of 7.6%. On the other hand, if the color red input grayscale level is 210, the color red grayscale level of the four-color video signal may be adjusted to 227 in order to increase the color red output luminance from the original value of 7.2% to the permissible value of 8.5%. The color red grayscale levels may be adjusted just as described above when the color red input grayscale level is 186 or 223.

As also can be seen from FIG. 3, the gamma characteristic of the red subpixel R cannot be adjusted at every grayscale level to its gamma characteristic when the highest luminance is 13%. Specifically, if the grayscale level is equal or close to the highest grayscale (i.e., grayscale level 255), the gamma characteristic of the red subpixel R cannot agree with its gamma characteristic when the highest luminance is 13%. The reason is that no matter how the signal is converted, the highest luminance itself of the color red displayed by the LCD panel 10 remains 11%.

In order to realize even higher display quality, it is recommended to set the luminance of the color red to be equal to or greater than the permissible value (i.e., to adjust the gamma characteristic of the red subpixel R to its gamma characteristic when the highest luminance is 13% or more) at least at input grayscale levels of 186 through 223. That is to say, the signal conversion circuit 20 suitably adjusts the level of the four-color video signal so that when a three-primary-color video signal, in which the color red has a grayscale level r of 186 to 223, is input, the luminance of the color red displayed by the red subpixel R becomes equal to or greater than $13(r/255)^{1/0.45}$%.

Figure 4:
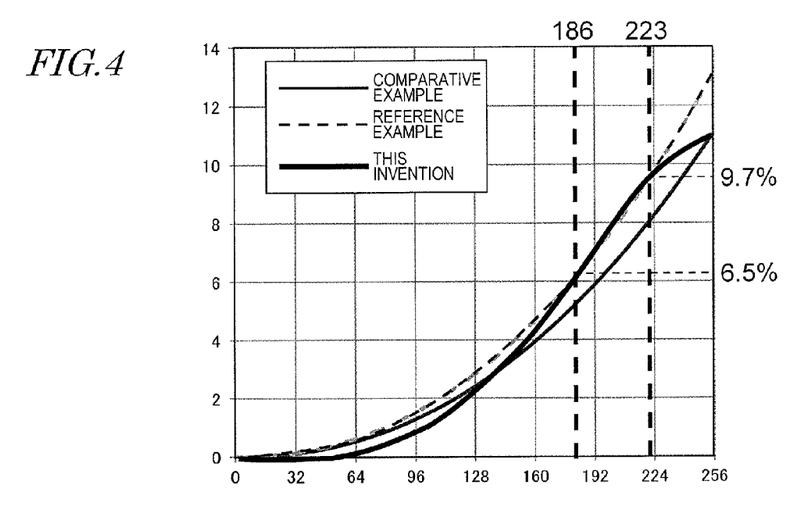
[FIG. 4] A graph which shows the gamma characteristic of the red subpixel R of the liquid crystal display device 100 and of which the abscissa represents the color red input grayscale level and the ordinate represents the color red output luminance.

In the example shown in FIG. 3, even at an input grayscale level of less than 186, the gamma characteristic of the red subpixel R agrees with its gamma characteristic when the highest luminance is 13% (i.e., the luminance of the color red becomes $13(r/255)^{1/0.45}$%). However, the level of the four-color video signal may also be adjusted as shown in FIG. 4. In the example shown in FIG. 4, at input grayscale levels of less than 186, the gamma characteristic of the red subpixel R does not agree with its gamma characteristic when the highest luminance is 13% (reference example). Nevertheless, at an input grayscale level of 186 through 223 at which the decrease in the impressiveness of the color red or orange is easily sensible, the gamma characteristic of the red subpixel R does agree with its gamma characteristic when the highest luminance is 13% (reference example). Consequently, sufficiently high display quality is realized in practice.

Subsequently, a specific configuration for the signal conversion circuit 20 that the liquid crystal display device 100 of this embodiment has will be described.

Figure 5:
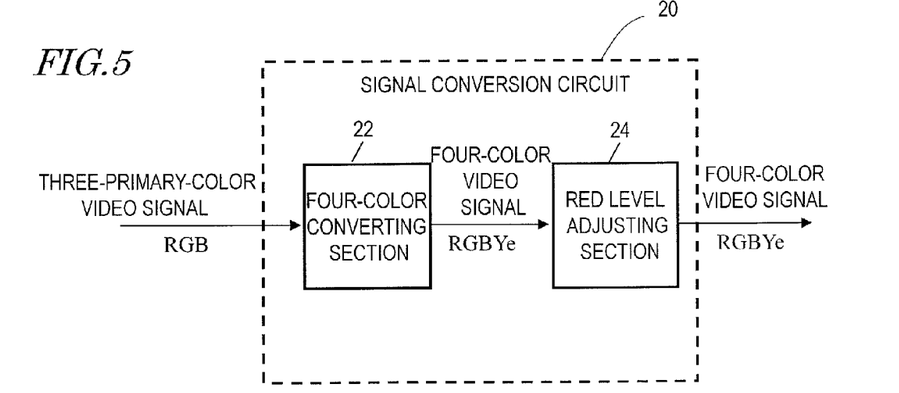
[FIG. 5] A block diagram illustrating an exemplary suitable configuration for the signal conversion circuit 20 that the liquid crystal display device 100 has.

FIG. 5 illustrates an exemplary specific configuration for the signal conversion circuit 20. The signal conversion circuit 20 shown in FIG. 5 includes a four-color converting section 22 and a red level adjusting section 24.

The four-color converting section 22 generates a four-color video signal based on the input three-primary-color video signal. However, the four-color converting section 22 does not adjust the level of the four-color video signal. That is to say, if the four-color video signal obtained by the four-color converting section 22 were output as it is to the LCD panel 10, then the color red output luminance would not be different from its original value. As a specific conversion algorithm for generating the four-color video signal, any of various known algorithms for converting a three-primary-color video signal into a multi-primary-color video signal may be used.

The red level adjusting section 24 adjusts the grayscale level of the color red of the four-color video signal obtained by the four-color converting section 22. For example, by providing a lookup table on which stored is data about grayscale levels corresponding to the permissible values of the color red output luminances, the red level adjusting section 24 can adjust the grayscale level of the color red by reference to the lookup table. Naturally, the grayscale level may also be adjusted by calculation instead of referring to such a lookup table.

Hereinafter, a specific example of such a conversion algorithm to be used by the four-color converting section 22 to generate a four-color video signal will be described. As a conversion algorithm for the four-color converting section 22, the conversion algorithm disclosed in Japanese Laid-Open Patent Publication No. 2005-303989 can be used effectively, for example. That conversion algorithm will be described with reference to FIG. 6.

Figure 6:
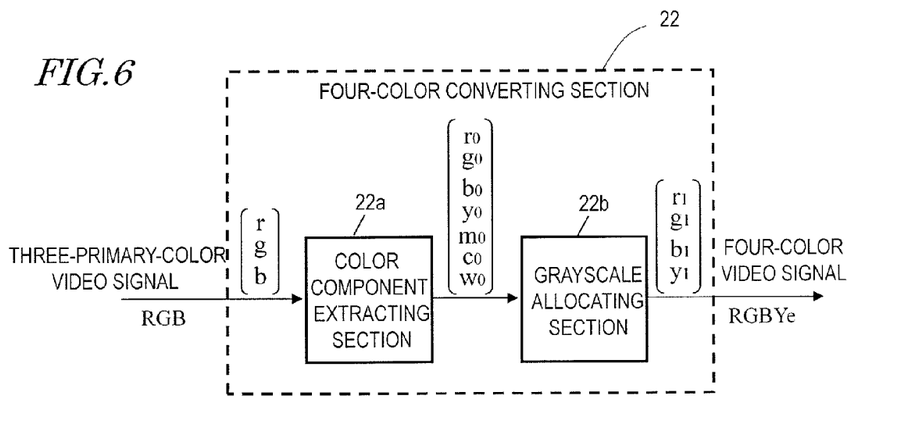
[FIG. 6] A block diagram illustrating an exemplary suitable configuration for the four-color converting section 22 that the signal conversion circuit 20 has.

FIG. 6 is a block diagram illustrating an exemplary specific configuration for the four-color converting section 22. The four-color converting section 22 shown in FIG. 6 includes a color component extracting section 22a and a grayscale allocating section 22b.

The color component extracting section 22a extracts seven color components (namely, red, green, blue, yellow, magenta, cyan and white components), from the input three-primary-color video signal. The color components may be extracted in the following manner.

According to the respective grayscale levels r, and b of the colors red, green and blue, input three-primary-color video signals may be classified into the following six patterns (1) to (6):

(1) $r \geq g \geq b$
(2) $r \geq b > g$
(3) $b > r \geq g$
(4) $b > g > r$
(5) $g \geq b > r$
(6) $g \geq r \geq b$ If the grayscale levels of these red, green, blue, yellow, magenta, cyan and white components are identified by $r_0$, $g_0$, $b_0$, $y_0$, $m_0$, $c_0$ and $w_0$, respectively, then the grayscale levels of the respective color components can be calculated in the following manner on a pattern by pattern basis:

If Pattern (1) is Satisfied

Figure 7:
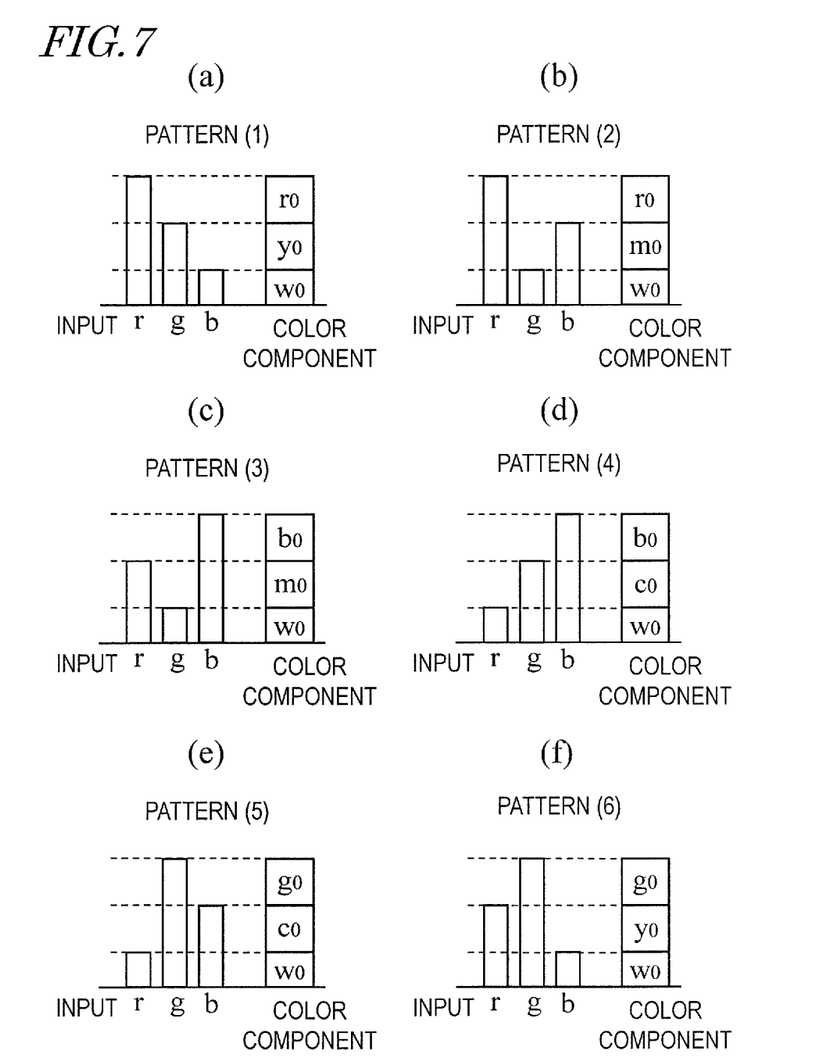

If $r \geq g \geq b$ is satisfied, then the difference between the color red grayscale level r and the color green grayscale level g becomes the red component's grayscale level $r_0$ (i.e., $r_0 = r - g$) as shown in FIG. 7(a). Also, the difference between the color green grayscale level g and the color blue grayscale level b becomes the yellow component's grayscale level $y_0$ (i.e., $y_0 = g - b$). Furthermore, the color blue grayscale level b becomes equal to the white component's grayscale level $w_0$ (i.e., $w_0 = b$). The grayscale levels $g_0$, $b_0$, $m_0$ and $c_0$ of the green, blue, magenta and cyan components all become equal to zero (i.e., $g_0 = b_0 = m_0 = c_0 = 0$).

If Pattern (2) is Satisfied

If $r \geq b > g$ is satisfied, then the difference between the color red grayscale level r and the color blue grayscale level b becomes the red component's grayscale level $r_0$ (i.e., $r_0 = r - b$) as shown in FIG. 7(b). Also, the difference between the color blue grayscale level b and the color green grayscale level g becomes the magenta component's grayscale level $m_0$ (i.e., $m_0 = b - g$). Furthermore, the color green grayscale level g becomes equal to the white component's grayscale level $w_0$ (i.e., $w_0 = g$). The grayscale levels $g_0$, $b_0$, $y_0$ and $c_0$ of the green, blue, yellow and cyan components all become equal to zero (i.e., $g_0 = b_0 = y_0 = c_0 = 0$).

If Pattern (3) is Satisfied

If $b > r \geq g$ is satisfied, then the difference between the color blue grayscale level b and the color red grayscale level r becomes the blue component's grayscale level $b_0$ (i.e., $b_0 = b - r$) as shown in FIG. 7(c). Also, the difference between the color red grayscale level r and the color green grayscale level g becomes the magenta component's grayscale level $m_0$ (i.e., $m_0 = r - g$). Furthermore, the color green grayscale level g becomes equal to the white component's grayscale level $w_0$ (i.e., $w_0 = g$) The grayscale levels $r_0$, $g_0$, $y_0$ and $c_0$ of the red, green, yellow and cyan components all become equal to zero (i.e., $r_0 = g_0 = y_0 = c_0 = 0$).

If Pattern (4) is Satisfied

If $b > g > r$ is satisfied, then the difference between the color blue grayscale level b and the color green grayscale level g becomes the blue component's grayscale level $b_0$ (i.e., $b_0 = b - g$) as shown in FIG. 7(d). Also, the difference between the color green grayscale level g and the color red grayscale level r becomes the cyan component's grayscale level $c_0$ (i.e., $c_0 = g - r$). Furthermore, the color red grayscale level r becomes equal to the white component's grayscale level $w_0$ (i.e., $w_0 = r$). The grayscale levels $r_0$, $g_0$, $y_0$ and $m_0$, of the red, green, yellow and magenta components all become equal to zero (i.e., $r_0 = g_0 = y_0 = m_0 = 0$).

If Pattern (5) is Satisfied

If $g \geq b > r$ is satisfied, then the difference between the color green grayscale level g and the color blue grayscale level b becomes the green component's grayscale level $g_0$ (i.e., $g_0 = g - b$) as shown in FIG. 7(e). Also, the difference between the color blue grayscale level b and the color red grayscale level r becomes the cyan component's grayscale level $c_0$ (i.e., $c_0 = g - r$). Furthermore, the color red grayscale level r becomes equal to the white component's grayscale level $w_0$ (i.e., $w_0 = r$). The grayscale levels $r_0$, $b_0$, $y_o$ and $m_0$ of the red, blue, yellow and magenta components all become equal to zero (i.e., $r_0 = b_0 = y_0 = m_0 = 0$).

If Pattern (6) is Satisfied

If $g > r \geq b$ is satisfied, then the difference between the color green grayscale level g and the color red grayscale level r becomes the green component's grayscale level $g_0$ (i.e., $g_0 = g - r$) as shown in FIG. 7(f). Also, the difference between the color red grayscale level r and the color blue grayscale level b becomes the yellow component's grayscale level $y_0$ (i.e., $y_0 = r - b$). Furthermore, the color blue grayscale level b becomes equal to the white component's grayscale level $w_0$ (i.e., $w_0 = r$). The grayscale levels $r_0$, $b_0$, $m_0$ and $c_0$ of the red, blue, magenta and cyan components all become equal to zero (i.e., $r_0 = b_0 = m_0 = c_0 = 0$).

The respective color components' grayscale levels thus calculated are allocated to their associated subpixels. Specifically, the red component's grayscale level $r_0$ is allocated to the red subpixel R which is a subpixel contributing to displaying the color red. The green component's grayscale level $g_0$ is allocated to the green subpixel R which is a subpixel contributing to displaying the color green. The blue component's grayscale level $b_0$ is allocated to the blue subpixel B which is a subpixel contributing to displaying the color blue. The yellow component's grayscale level $y_0$ is allocated to the red, green and yellow subpixels R, G and Ye which are subpixels contributing to displaying the color yellow. The magenta component's grayscale level $m_0$ is allocated to the red and blue subpixels R and B which are subpixels contributing to displaying the color magenta. The cyan component's grayscale level $c_0$ is allocated to the green and blue subpixels G and B which are subpixels contributing to displaying the color cyan. And the white component's grayscale level $w_0$ is allocated to the red, green, blue and yellow subpixels R, G, B and Ye (i.e., all the subpixels) which are subpixels contributing to displaying the color white.

Consequently, if the colors red, green, blue, and yellow grayscale levels represented by the four-color video signal (i.e., the output grayscale levels) are identified by $r_1$, $g_1$, $b_1$ and $y_1$, respectively, the colors red, green, blue, and yellow output grayscale levels $r_1$, $g_1$, $b_1$ and $y_1$ are represented by the following Equations (8) to (11), respectively:

$$r_1 = r_0 + y_0 + m_0 + w_0 \quad (8)$$

$$g_1 = g_0 + y_0 + c_0 + w_0 \quad (9)$$

$$b_1 = b_0 + m_0 + c_0 + w_0 \quad (10)$$

$$y_1 = y_0 + w_0 \quad (11)$$

Figure 8:
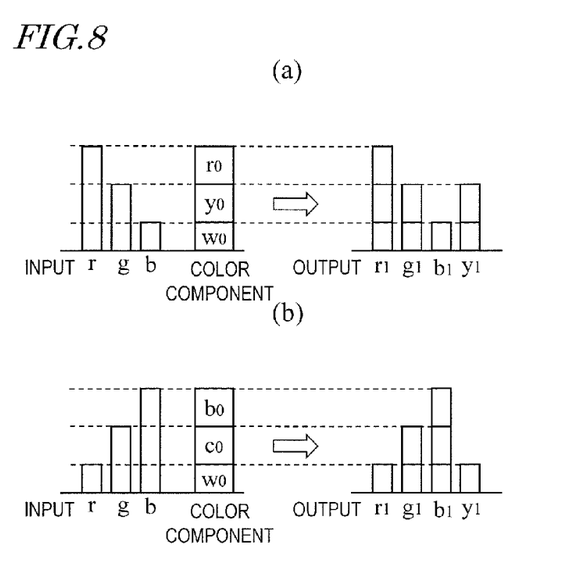

FIG. 8(a) schematically illustrates how to allocate the respective grayscales when pattern (1) (more strictly, pattern (1) and r>g>b) is satisfied. In that case, the color components to be extracted from the input three-primary-color video signal are red, yellow and white components as shown on the left-hand side of FIG. 8(a). That is why the color red output grayscale level $r_1$ becomes the sum of the red, yellow and white components' grayscale levels $r_0$, $y_0$ and $w_0$ (i.e., $r_1 = r_0 + y_0 + w_0$) as shown on the right-hand side of FIG. 8(a). In the same way, the color green output grayscale level $g_1$ becomes the sum of the yellow and white components' grayscale levels $y_0$ and $w_0$ (i.e., $g_1 = y_0 + w_0$). Also, the color blue output grayscale level $b_1$ is equal to the white component's grayscale level $w_0$ (i.e., $b_1 = w_0$). And the color yellow output grayscale level $y_1$ becomes the sum of the yellow and white components' grayscale levels $y_0$ and $w_0$ (i.e., $y_1 = y_0 + w_0$).

FIG. 8(b) schematically illustrates how to allocate the respective grayscales when pattern (4) is satisfied. In that case, the color components to be extracted from the input three-primary-color video signal are blue, cyan and white components as shown on the left-hand side of FIG. 8(b). That is why the color red output grayscale level $r_1$ becomes equal to the white component's grayscale level $w_0$ (i.e., $r_1 = w_0$) as shown on the right-hand side of FIG. 8(b). In the same way, the color green output grayscale level $g_1$ becomes the sum of the cyan and white components' grayscale levels $c_0$ and $w_0$ (i.e., $g_1 = c_0 + w_0$). Also, the color blue output grayscale level $b_1$ becomes the sum of the blue, cyan and white components grayscale levels $b_0$, $c_0$ and $w_0$ (i.e., $b_1 = b_0 + c_0 + w_0$) And the color yellow output grayscale level $y_1$ is equal to the white component's grayscale level $w_0$ (i.e., $y_1 = w_0$).

It should be noted that the grayscale allocating method described above (and represented by Equations (8) to (11)) is the simplest one and could be modified appropriately as disclosed in Japanese Laid-Open Patent Publication No. 2005-303989.

INDUSTRIAL APPLICABILITY

A multi-primary-color liquid crystal display device according to the present invention can conduct a display operation of quality, and therefore, can be used effectively in LCD TVs and various other kinds of electronic devices.

REFERENCE SIGNS LIST

10 LCD panel
20 signal conversion circuit
22 four-color converting section
22a color component extracting section
22b grayscale allocating section
24 red level adjusting section
100 liquid crystal display device
R red subpixel
G green subpixel
B blue subpixel
Ye yellow subpixel

The invention claimed is:

1. A multi-primary-color liquid crystal display device comprising a liquid crystal display panel with a pixel made up of red, green, blue and yellow subpixels,
the device further comprising a signal conversion circuit which converts an input three-primary-color video signal into a four-color video signal corresponding to the colors red, green, blue and yellow that are displayed by the red, green, blue and yellow subpixels, respectively,
wherein when the three-primary-color video signal supplied to the signal conversion circuit is indicated as (r, g, b) using the grayscale levels r, g and b (each of which is an integer of 0 through 255) of the three primary colors of red, green and blue and when the luminance of the color white displayed by the pixel in response to a three-primary-color video signal indicated as (255, 255, 255) is supposed to be 100%,
the signal conversion circuit adjusts the level of the four-color video signal so that when a three-primary-color video signal indicated as (186, 0, 0) is input, the luminance of the color red displayed by the red subpixel, which is a relative luminance of the red subpixel compared to a maximum luminance of the pixel, becomes equal to or greater than 6.5%.

2. The multi-primary-color liquid crystal display device of claim 1,
wherein when a three-primary-color video signal indicated as (223, 0, 0) has been input, the signal conversion circuit adjusts the level of the four-color video signal so that the luminance of the color red displayed by the red subpixel becomes equal to or greater than 9.7%.

3. The multi-primary-color liquid crystal display device of claim 1, wherein the signal conversion circuit adjusts the level of the four-color video signal so that when a three-primary-color video signal, in which the color red has a grayscale level r of 186 or more, is input, the luminance of the color red displayed by the red subpixel becomes equal to or greater than 6.5%.

4. The multi-primary-color liquid crystal display device of claim 1, wherein the signal conversion circuit adjusts the level of the four-color video signal so that when a three-primary-color video signal, in which the color red has a grayscale level r of 223 or more, is input, the luminance of the color red displayed by the red subpixel becomes equal to or greater than 9.7%.

5. The multi-primary-color liquid crystal display device of claim 1, wherein the signal conversion circuit adjusts the level of the four-color video signal so that when a three-primary-color video signal, in which the color red has a grayscale level r of 186 to 223, is input, the luminance of the color red displayed by the red subpixel becomes equal to or greater than $13(r/255)^{1/0.45}$%.

6. The multi-primary-color liquid crystal display device of claim 1, wherein the respective areas of the red, green, blue and yellow subpixels are equal to each other.

7. The multi-primary-color liquid crystal display device of claim 1, wherein the signal conversion circuit includes a four-color converting section which generates the four-color video signal based on the input three-primary-color video signal and a red level adjusting section which adjusts the grayscale level of the color red of the four-color video signal obtained by the four-color converting section.

8. The multi-primary-color liquid crystal display device of claim 1, wherein the red, green, blue and yellow subpixels have red, green, blue and yellow color filters, respectively, and an optical transmittance of the yellow color filter is higher than that of the red color filter.

9. A multi-primary-color liquid crystal display device comprising a liquid crystal display panel with a pixel made up of red, green, blue and yellow subpixels, the device further comprising a signal conversion circuit which converts an input three-primary-color video signal into a four-color video signal corresponding to the colors red, green, blue and yellow that are displayed by the red, green, blue and yellow subpixels, respectively, wherein if the three-primary-color video signal supplied to the signal conversion circuit is indicated as (r, g, b) using the grayscale levels r, g and b (each of which is an integer of 0 through 255) of the three primary colors of red, green and blue and when the luminance of the color white displayed by the pixel in response to a three-primary-color video signal indicated as (255, 255, 255) is supposed to be 100%, the signal conversion circuit adjusts the level of the four-color video signal so that when a three-primary-color video signal indicated as (223, 0, 0) is input, the luminance of the color red displayed by the red subpixel, which is a relative luminance of the red subpixel compared to a maximum luminance of the pixel, becomes equal to or greater than 9.7%.

10. The multi-primary-color liquid crystal display device of claim 9, wherein the signal conversion circuit adjusts the level of the four-color video signal so that when a three-primary-color video signal, in which the color red has a grayscale level r of 186 or more, is input, the luminance of the color red displayed by the red subpixel becomes equal to or greater than 6.5%.

11. The multi-primary-color liquid crystal display device of claim 9, wherein the signal conversion circuit adjusts the level of the four-color video signal so that when a three-primary-color video signal, in which the color red has a grayscale level r of 223 or more, is input, the luminance of the color red displayed by the red subpixel becomes equal to or greater than 9.7%.

12. The multi-primary-color liquid crystal display device of claim 9, wherein the signal conversion circuit adjusts the level of the four-color video signal so that when a three-primary-color video signal, in which the color red has a grayscale level r of 186 to 223, is input, the luminance of the color red displayed by the red subpixel becomes equal to or greater than $13(r/255)^{1/0.45}$%.

13. The multi-primary-color liquid crystal display device of claim 9, wherein the respective areas of the red, green, blue and yellow subpixels are equal to each other.

14. The multi-primary-color liquid crystal display device of claim 9, wherein the signal conversion circuit includes a four-color converting section which generates the four-color video signal based on the input three-primary-color video signal and a red level adjusting section which adjusts the grayscale level of the color red of the four-color video signal obtained by the four-color converting section.

15. The multi-primary-color liquid crystal display device of claim 9, wherein the red, green, blue and yellow subpixels have red, green, blue and yellow color filters, respectively, and an optical transmittance of the yellow color filter is higher than that of the red color filter.

* * * * *